United States Patent [19]

Nesheiwat et al.

[11] Patent Number: 5,041,532
[45] Date of Patent: Aug. 20, 1991

[54] METHOD OF TREATING A POLY(ARYLENE SULFIDE/SULFONE) RESIN, AND COMPOSITION OF MATTER MADE IN ACCORDANCE THEREWITH

[75] Inventors: Afif M. Nesheiwat, Madison, N.J.; Rex L. Bobsein, Bartlesville, Okla.

[73] Assignee: Phillips Petroleum Company, Bartlesville, Okla.

[21] Appl. No.: 512,435

[22] Filed: Apr. 23, 1990

[51] Int. Cl.$^5$ .................. C08G 75/16; C08G 75/20
[52] U.S. Cl. ........................... 528/480; 528/388; 528/481; 528/502
[58] Field of Search ............... 528/480, 481, 502, 388

[56] References Cited

U.S. PATENT DOCUMENTS 3,478,000 11/1969 Saunders et al. .................. 260/79.1
3,524,835 8/1970 Edmonds, Jr. et al. ............ 260/79.1
3,562,199 2/1971 Hill, Jr. et al. .................... 260/37
4,016,145 5/1977 Campbell ........................ 260/79.3 M
4,113,698 9/1978 Staniland ............................. 528/481
4,274,993 6/1981 Narisawa et al. .................. 260/37 R
4,301,274 11/1981 Campbell ............................ 528/388

Primary Examiner—Harold D. Anderson
Attorney, Agent, or Firm—Laney, Dougherty, Hessin & Beavers

[57] ABSTRACT

A method of making a poly(arylene sulfide/sulfone) resin comprises heating amorphous poly(arylene sulfide/sulfone) resin at an elevated temperature but below the melting temperature of the resin in a vacuum environment so that extrudate made from the resin is smooth and has reduced gas bubble content. The invention also relates to poly(arylene sulfide/sulfone) resin made in accordance with the method.

21 Claims, No Drawings

METHOD OF TREATING A POLY(ARYLENE SULFIDE/SULFONE) RESIN, AND COMPOSITION OF MATTER MADE IN ACCORDANCE THEREWITH

BACKGROUND OF THE INVENTION

This invention relates generally to methods of making a poly(arylene sulfide/sulfone) resin and compositions of matter made in accordance therewith. More particularly, but not by way of limitation, the present invention relates to a method of making an amorphous poly(phenylene sulfide/sulfone) resin so that extrudate made from the resin is smooth and has reduced gas bubble content.

Amorphous arylene sulfide/sulfone polymers can be made into a base form, such as solidified granular resins, from which further forms can be made, such as through extrusion processes. One type of such a resin is granular amorphous poly(phenylene sulfide/sulfone) resin produced in accordance with U.S. Pat. No. 4,016,145 to Campbell or U.S. Pat. No. 4,301,274 to Campbell.

These amorphous poly(arylene sulfide/sulfone) resins have posed a gassing problem during their extrusion. That is, the extrudate of such a resin as taken from a melt flow machine used in the extrusion process can be very rough and somewhat brittle and can contain a large amount of gas bubbles. These are typically not desired characteristics. Therefore, there is the need for an improved type of amorphous poly(arylene sulfide/sulfone) resin, and method of making it, from which smooth, reduced bubble content extrudate can be made.

SUMMARY OF THE INVENTION

The present invention overcomes the above-noted and other shortcomings of the prior art by providing a novel and improved method of making a poly(arylene sulfide/sulfone) resin and a novel and improved composition of matter made in accordance therewith. In particular, the present invention provides an amorphous poly(arylene sulfide/sulfone) resin and method of making the same from which smooth, reduced bubble content extrudate can be made.

The present invention provides a method of making a poly(arylene sulfide/sulfone) resin, comprising heating amorphous poly(arylene sulfide/sulfone) resin at an elevated temperature but below the melting temperature of the resin in a vacuum environment so that extrudate made from the resin is smooth and has reduced gas bubble content.

The present invention also provides as a composition of matter, a poly(arylene sulfide/sulfone) resin made in accordance with the method of the present invention.

Therefore, from the foregoing, it is a general object of the present invention to provide a novel and improved method of making a poly(arylene sulfide/sulfone) resin and a composition of matter made in accordance therewith. Other and further objects, features and advantages of the present invention will be readily apparent to those skilled in the art upon a reading of the following description of the preferred embodiments.

DETAILED DESCRIPTION OF PREFERRED EMBODIMENTS

The present invention provides a method of making a poly(arylene sulfide/sulfone) resin. This method comprises heating amorphous poly(arylene sulfide/sulfone) resin at an elevated temperature but below the melting temperature of the resin in a vacuum environment. This is performed so that extrudate made from the resin is smooth and has reduced gas bubble content.

The heating of the resin can be effected by conventional means. For example, the heating can be performed in a conventional vacuum oven suitable for drying the particular resin at the desired temperature and vacuum conditions.

The parent or feedstock amorphous poly(arylene sulfide/sulfone) resin to be heated is preferably obtained by producing a solidified poly(arylene sulfide/sulfone) resin having a sulfone content of at least 50% of the combined sulfide/sulfone content. This is preferably produced in accordance with U.S. Pat. No. 4,016,145 to Campbell or U.S. Pat. No. 4,301,274 to Campbell, both of which are incorporated herein by reference. The result of such production is typically wet solidified granular resin which is to be dried. Such drying includes heating in accordance with the present invention.

The parent resin produced, or otherwise obtained from a suitable source, is preferably solidified granular amorphous poly(phenylene sulfide/sulfone) resin.

The parent resin which is to be used in the method of the present invention has a glass transition temperature. For the types of resin just described, the glass transition temperature is within the range of about 200° C. to about 270° C.

Such a resin also has what is called herein a melting temperature. Because the resin is amorphous, the melting temperature is defined herein as the temperature at which the discrete granules coalesce. For the types described herein, this temperature is about 300° C.

The elevated temperature at which the parent resin is heated is at least sufficient to improve the extrudate as indicated above, but below the melting temperature. Thus, for the above types of resin and temperature characteristics, the heating of the present invention is within the range between about 160° C. and about 300° C. The preferred range is from about 160° C. to about 270° C., and more preferably from about 170° C. to about 270° C. Another preferred range is between the glass transition temperature and about 300° C. Heating at the selected temperature is performed for an adequate time to achieve the desired result of providing a resin from which smooth, reduced gas bubble content extrudate can be made. A particular duration of heating is related to the selected temperatures; however, for the above-stated temperature ranges, heating is preferably performed for a time within the range of about five minutes to about one hundred hours and is more preferably performed for a time within the range of about three hours to about eighty hours.

Possibly the aforementioned temperatures allow for greater molecular mobility and release volatiles to a greater extent than in lower temperature drying (e.g., drying of crystalline poly(arylene sulfide) resin at 130° C.); however, this is not limiting of our invention.

The vacuum environment in which the parent resin is heated is any suitable vacuum environment; however, a preferred vacuum measurement is 29 inches mercury.

Using the method of the present invention, an improved poly(arylene sulfide/sulfone), and preferably poly(phenylene sulfide/sulfone), resin is made as an improved composition of matter from which an improved melt flow extrudate can be obtained when the produced resin is extruded.

The following examples further illustrate the present invention.

EXAMPLE I

A phenylene sulfide/sulfone polymer from the following polymerization was selected as a parent polymer. The polymerization was performed in a two-gallon stainless steel autoclave manufactured by Autoclave Engineers, Inc. In this polymerization 2.0 mol sodium hydrosulfide (58.98 wt.% as an aqueous solution), 2.0 mol sodium acetate, 2.0 mol sodium carbonate, 6.0 mol water, 26.5 mol N-methyl-2-pyrrolidone, and 2.04 mol bis(4-chlorophenyl sulfone) were charged into the reactor. The autoclave was then sealed up and purged four times with nitrogen. The agitation rate was adjusted to 400 rpm. The autoclave was heated with an electric heating mantle, and the temperature was raised to 200° C. over the course of an hour and fifteen minutes. After a hold period of three hours, 713 mL of water were pumped into the reactor. The heating was discontinued and the reactor was cooled to room temperature. The granular product was given three washes with 80° C. water and was then dried in a forced-air oven at 120° C. for at least 12 hours. About 9.93 grams of the resulting parent poly(phenylene sulfide/sulfone) resin, having a melt flow of 63.7 grams per 10 minutes, was placed in a vacuum oven at full vacuum (28-30mm Hg) for 3.5 hours at 240° C. The weight of the dried sample taken from the vacuum oven was 9.74 grams, a loss of 0.19 grams or about 2%. The dried sample had a melt flow of 60.4 grams per 10 minutes. The dried resin was extruded through a melt flow machine [according to ASTM method 1238-79 condition 343/5.0 modified with a five minute preheat period] to form an extrudate which had a large decrease in the amount of gassing in comparison to extrudate made from the untreated parent resin.

EXAMPLE II

Another portion of the parent polymer used in Example I was heated under vacuum in a 2-inch steel pipe cylinder using a heat tape as a heating medium. The sample was heated in a sample dish to 310° C. for two hours. After the sample was cooled, the granules had coalesced and had a large amount of bubbles. This resin, dried above its melting temperature, also had a melt extrudate with a large amount of bubbles. The extrudate was obtained using the method described above.

EXAMPLE III

A sample A of the parent polymer used in Example I and a sample B of another parent poly(phenylene sulfide/sulfone) resin were placed in a vacuum oven. A vacuum pump was connected to the oven and applied full vacuum. The resin samples were heated for six hours at 250° C. The resin samples remained in granular form. The melt flows of the dried samples are compared in the following table:

| Sample | Melt Flow Before Drying (grams/10 mins.) | Melt Flow After Drying (grams/10 mins.) |
|---|---|---|
| A | 63.7 | 53 |
| B | 23 | 20 |

The resin samples were processed through a melt flow machine according to the method described above to form extrudates exhibiting a great improvement in the reduction of gas bubbles.

EXAMPLE IV

A phenylene sulfide/sulfone polymer sample was heated at 125° C. for 70 hours under vacuum similar to previous Examples. Following this, the polymer exhibited a melt flow (determined as before) of 9.7, with the extrudate being very gassy and dark. This is an example of the heat treating conditions being insufficient.

A phenylene sulfide/sulfone sample from the same parent as above was heated at 160° C. for 70 hours under vacuum as above. Following this, the polymer exhibited a melt flow of 7.4, with the extrudate having very few gas bubbles, good color at the beginning and somewhat darker later. This is an example of heat treating conditions which are marginally acceptable for this polymer.

Thus, the present invention is well adapted to carry out the objects and attain the ends and advantages mentioned above as well as those inherent therein. While preferred embodiments of the invention have been described for the purpose of this disclosure, changes in the performance of steps can be made by those skilled int he art, which changes are encompased within the spirit of this invention as defined by the appended claims.

What is claimed is:

1. A method of making a poly(arylene sulfide/sulfone) extrudate comprising:
   heating an amorphous poly(arylene sulfide/sulfone) feedstock resin at an elevated temperature but below the melting temperature of the poly(arylene sulfide/sulfone) resin in a vacuum environment;
   and extruding the resin, resulting in smooth extrudate having reduced inclusion of gas bubbles.

2. The method of claim 1, wherein the resin is a poly(phenylene sulfide/sulfone) resin.

3. The method of claim 1, wherein the temperature is within the range of about 160° C. to about 300° C.

4. The method of claim 1, wherein the temperature is within the range of about 170° C. to about 270° C.

5. The method of claim 1, further comprising performing said heating for a time within the range of about three hours to about eighty hours.

6. As a composition of matter, a poly(arylene sulfide/sulfone) extrudate made in accordance with claim 1.

7. A method of treating a poly(phenylene sulfide/sulfone) resin, comprising drying granular amorphous poly(phenylene sulfide/sulfone) resin, including heating the granular resin to a temperature between about 170° C. and about 270° C. in a vacuum environment for a time between about three hours and about eighty hours.

8. As a composition of matter, a poly(phenylene sulfide/sulfone) resin treated in accordance with claim 7.

9. A method of treating a poly(arylene sulfide/sulfone) resin, comprising heating an amorphous granular poly(arylene sulfide/sulfone) resin, having a glass transition temperature within the range of about 200° C. to about 270° C., at a temperature between the glass transition temperature and about 300° C., in a vacuum environment.

10. The method of claim 9, wherein the granular resin is granular amorphous poly(phenylene sulfide/sulfone) resin.

11. The method of claim 9, further comprising performing said heating for a time within the range of about three hours to about eighty hours.

12. The method of claim 11, wherein the vacuum environment has a vacuum measurement of 29 inches mercury.

13. As a composition of matter, a poly(arylene sulfide/sulfone) resin treated in accordance with claim 9.

14. A method of making a poly(arylene sulfide/sulfone) extrudate, comprising:
providing a solidified poly(arylene sulfide/sulfone) feedstock resin having sulfone content of at least fifty percent of the combined sulfide/sulfone content, the resin having a glass transition temperature and a melting temperature;
drying the solidified resin at an elevated temperature but below the melting temperature in a vacuum environment; and
extruding the resin, to form a smooth extrudate having reduced inclusion of gas bubbles.

15. The method of claim 14 wherein the solidified poly(arylene sulfide/sulfone) feedstock resin is granular poly phenylene sulfide/sulfone) resin.

16. The method of claim 14, wherein the drying temperature is within the range of about 160° C. to about 300° C.

17. The method of claim 14, wherein the drying temperature is within the range of about 170° C. to about 270° C.

18. The method of claim 14, wherein said drying includes heating the solidified resin at a temperature between about 160° C. and about 300° C. in the vacuum environment for a time between about three hours and about eighty hours.

19. The method of claim 14, wherein said drying includes heating the solidified resin at a temperature between about 170° C. and about 270° C. in the vacuum environment for a time between about three hours and about eighty hours.

20. As a composition of matter, a poly(arylene sulfide/sulfone) extrudate made in accordance with claim 14.

21. A method of treating a poly(arylene sulfide/sulfone) parent resin, comprising drying amorphous poly(arylene sulfide/sulfone) parent resin, including heating the parent resin to a temperature between about 160° C. and about 300° C. in a vacuum environment for a time between about five minutes and about one hundred hours.

* * * * *